M. A. DOW.
CAR DERAILER.
APPLICATION FILED OCT. 10, 1910.
997,607.
Patented July 11, 1911.
2 SHEETS—SHEET 1.
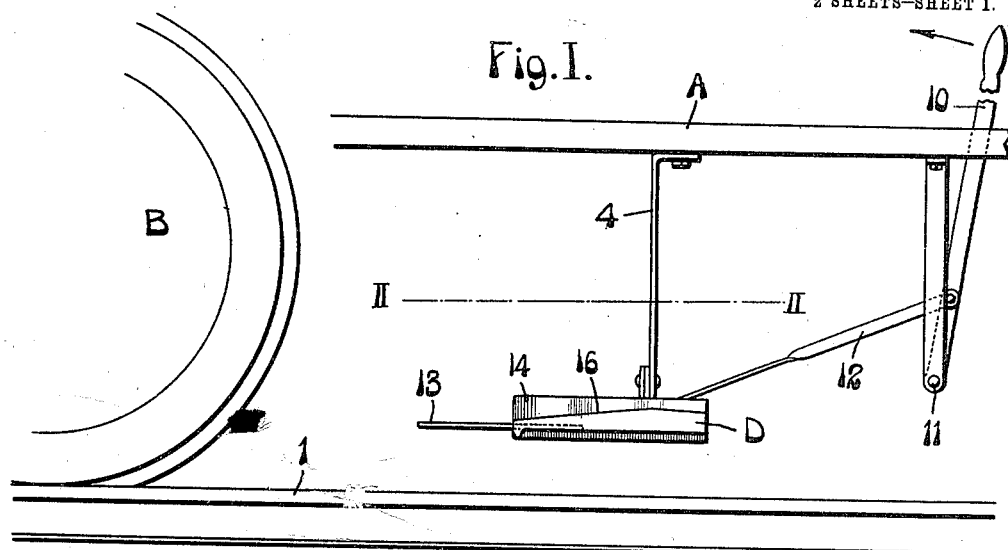
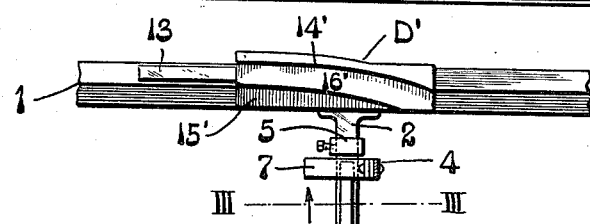
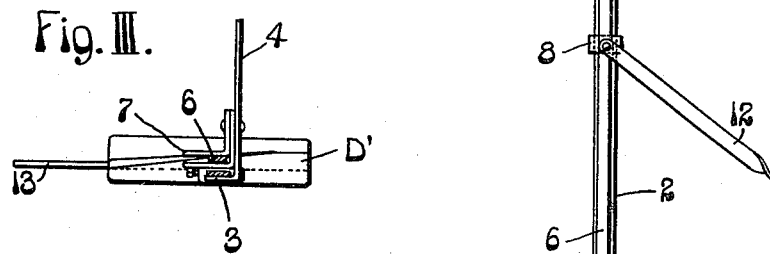
Attest
A. J. McCauley
H. G. Cook
Inventor:
M. A. Dow
by E. S. Knight
Att'y.

M. A. DOW.
CAR DERAILER.
APPLICATION FILED OCT. 10, 1910.
997,607.
Patented July 11, 1911.
2 SHEETS—SHEET 2.
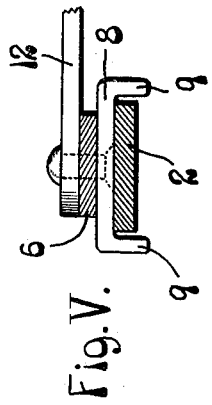
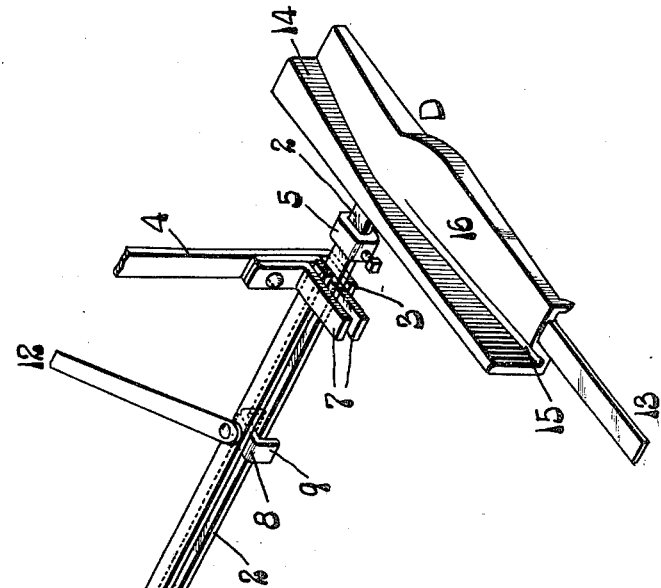
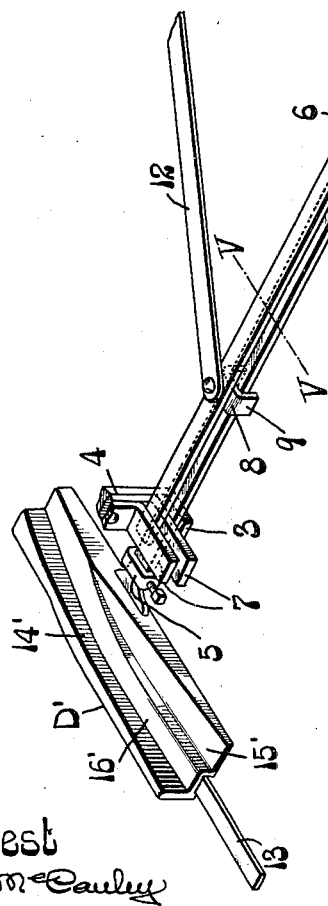
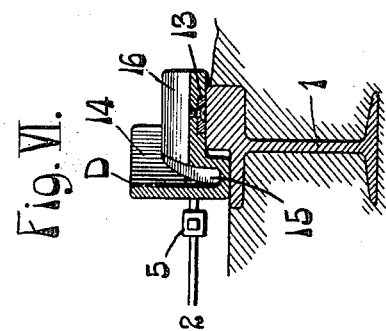
Inventor:
M. A. Dow

UNITED STATES PATENT OFFICE.

MERLE A. DOW, OF EAST ST. LOUIS, ILLINOIS.

CAR-DERAILER.

997,607.

Specification of Letters Patent.  Patented July 11, 1911.

Application filed October 10, 1910. Serial No. 586,323.

*To all whom it may concern:*

Be it known that I, MERLE A. Dow, a citizen of the United States of America, residing at East St. Louis, in the county of St. Clair and State of Illinois, have invented certain new and useful Improvements in Car-Derailers, of which the following is a full, clear, and exact description, reference being had to the accompanying drawings, forming a part of this specification.

My invention relates to a car derailer, and has for its object the production of such a device whereby a car may be derailed at the will of the person in charge of, or operating, the car.

In the preferred form of my invention, a pair of derailer blocks are detachably secured to the car at points in front of the truck wheels. These derailer blocks are normally locked in elevated position by a manually operated means which may be operated to release the blocks, allowing them to descend onto the track rails at points in the path of the truck wheels of the car.

A derailer of this character is more particularly intended for use as an emergency device for stopping the car to avert accidents when other devices fail to perform this function.

Figure I is a side elevation of a portion of a car equipped with my derailer. Fig. II is a section taken on the line II—II, Fig. I. Fig. III is a section taken on the line III—III, Fig. II. Fig. IV is a perspective view of the derailers and supports therefor. Fig. V is a section taken on line V—V, Fig. IV. Fig. VI is a vertical section showing one of the derailer blocks in operative position on a car track rail.

In the accompanying drawings: A designates a portion of a car underframe and B is one of the car wheels. A pair of derailer blocks D and D' located directly above the track rails 1 are connected by a bar 2 which rests on ledges 3 at the lower ends of derailer hanger bars 4 rigidly secured to the car underframe. The connecting bar 2 has its ends secured to the derailer blocks and it is provided with set collars 5, which may be adjusted to engage the hanger bars 4 (see Fig. II.). These collars 5 prevent the connecting bar 2 from shifting longitudinally, and thus retain the derailer blocks in alinement with the track rails.

The means for locking my derailer to a car comprises a locking bar 6, the ends of which are slidably mounted between flanges 7 on the hanger bars 4, said locking bar being provided with dogs 8 having lips 9 that engage opposite sides of the connecting bar 2. The dogs 8 normally prevent the connecting bar 2 from sliding laterally on the flanges 3. An operating handle 10, (see Fig. I), pivoted at 11, is connected to the locking bar 6 by links 12. To release the derailers and allow them to descend onto track rails, it is only necessary to slide the locking bar 6 by moving the operating handle 10 in the direction indicated by the arrow in Fig. I. This action causes the dogs 8 to dislodge the derailer by moving the connecting bar 2 to a point beyond the free ends of the ledges 3 of the hanger bars 4 which support said connecting bar.

To prevent the derailing device from sliding when engaged by the car wheels, each derailer block is provided with a flexible tongue 13 firmly clamped on the track rail by the wheel while the latter is moving onto the body portion of the derailer block.

The derailer block D has a cam face 14, adapted to be engaged by the inner face of a car wheel, a groove 15 for the reception of the flange of the wheel, and an inclined face 16 for causing the wheel to move upwardly while it is being deflected from the track by the cam face 14.

The derailer D' has a cam face 14' adapted to be engaged by the outer face of a car wheel, and an inclined face 16' for causing the wheel to move upwardly while it is being deflected by the cam face 14'.

I claim:—

1. The combination with a car, of a derailer support rigidly secured to said car, a derailer mounted on said support, a device for holding said derailer to the rigid support, and means for shifting said locking device so as to release the derailer from its support and allow it to fall on a track rail.

2. The combination with a car, of a derailer support rigidly secured to said car, a derailer loosely mounted on said rigid support, and means whereby said derailer may be deposited from said rigid support onto a track rail.

3. The combination with a car, of a derailer support rigidly secured to said car, a derailer loosely mounted on said support, and means whereby said derailer may be dislodged from said rigid support and deposited onto a track rail.

4. The combination with a car, of a derailer carried by said car and comprising a pair of derailer blocks and a connecting bar uniting them, a fixed support for said connecting bar, and means for shifting said connecting bar so as to discharge the derailer from said fixed support.

5. The combination with a car, of stationary hanger bars supported by said car, a derailer loosely mounted on said stationary hanger bars, and means whereby said derailer may be dislodged from said hangers and deposited onto a track rail.

6. The combination with a car, of hangers carried by said car, a derailer mounted on said hangers, a locking bar for holding said derailer while supported by the hangers, and means for moving said locking bar to dislodge the derailer from the hangers.

7. The combination with a car, of hangers carried by said car, a derailer loosely mounted on said hangers and comprising a pair of derailer blocks and a connecting bar, a locking bar by which said connecting bar is held upon the hangers, and means for shifting said locking bar to dislodge said derailer from said hangers.

8. The combination with a car, of hangers carried by said car, a derailer loosely mounted on said hangers and comprising a pair of derailer blocks and a connecting bar, a locking bar by which said connecting bar is held upon the hangers, and means for shifting said locking bar to dislodge said derailer from said hangers; said locking bar being provided with dogs engaging said connecting bar.

9. The combination with a car, of hangers carried by said car, a derailer comprising derailer blocks and a connecting bar, the latter of which is loosely mounted upon said hangers, and adjustable means on said connecting bar by which endwise movement of said derailer is regulated.

10. The combination with a car, of hangers carried by said car, a derailer comprising derailer blocks, and a connecting bar, the latter of which is loosely mounted upon said hangers, and set collars on said connecting bar by which endwise movement of said derailer is regulated.

11. In a derailer, a block adapted to receive the tread of a car wheel, and a flexible tongue projecting from one end of said block onto which the car wheel may ride before passing onto the block proper.

MERLE A. DOW.

In the presence of—
   Howard G. Cook,
   Edna B. Linn.

---

Copies of this patent may be obtained for five cents each, by addressing the "Commissioner of Patents, Washington, D. C."